United States Patent

Lotsch et al.

[11] Patent Number: 4,785,114
[45] Date of Patent: Nov. 15, 1988

[54] QUINOPHTHALONE DYES

[75] Inventors: Wolfgang Lotsch, Beindersheim; Peter Neumann, Wiesloch; Heinrich Kowarsch, Oberderdingen, all of Fed. Rep. of Germany

[73] Assignee: BASF Aktiengesellschaft, Rheinland-Pfalz, Fed. Rep. of Germany

[21] Appl. No.: 907,221

[22] Filed: Sep. 15, 1986

[30] Foreign Application Priority Data

Sep. 20, 1985 [DE] Fed. Rep. of Germany ....... 3533547
Sep. 20, 1985 [DE] Fed. Rep. of Germany ....... 3533544

[51] Int. Cl.$^4$ ............................................. C07D 401/12
[52] U.S. Cl. .................................... 546/171; 544/284; 544/354; 546/153; 546/154; 548/327; 548/471; 549/240; 549/243; 549/246
[58] Field of Search .................... 546/154, 171, 173; 544/300, 284, 354; 548/452, 454, 465, 483

[56] References Cited

U.S. PATENT DOCUMENTS 3,979,386 9/1976 von der Crone et al. .......... 544/284

FOREIGN PATENT DOCUMENTS

| 1140130 | 1/1983 | Canada | 544/300 |
| 2041999 | 3/1972 | Fed. Rep. of Germany | 544/300 |
| 2615394 | 10/1976 | Fed. Rep. of Germany | |
| 48-30656 | 9/1973 | Japan | 544/284 |
| 0121822 | 10/1978 | Japan | 546/154 |

OTHER PUBLICATIONS

Chemical Abstract for JP Pat. #48-30656, 9/21/73.
Chemical Abstract for JP Pat. #0121822, 10/24/78.

Primary Examiner—Nicholas S. Rizzo
Assistant Examiner—E. Bernhardt
Attorney, Agent, or Firm—Oblon, Fisher, Spivak, McClelland & Maier

[57] ABSTRACT

Quinophthalone dyes of the formula

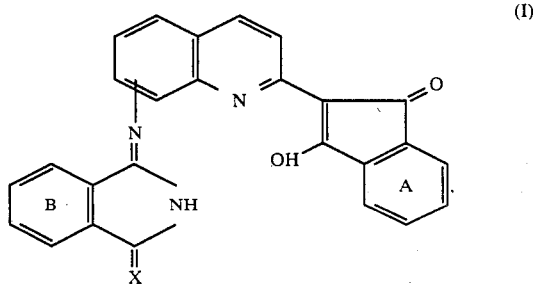

where X is O or NC—C—R, where R is cyano, unsubstituted or N-substituted carbamyl, carboalkoxy, quinazolonyl, quinoxalinonyl, benzimidazolyl or benzothiazolyl and the rings A, B, the quinoline system and/or the fused benzo systems may be substituted by insolubilizing groups, in surface finishes, printing inks and plastics, in particular in thermoplastics, gives bright hues having good fastness properties coupled with high thermostability.

3 Claims, No Drawings

QUINOPHTHALONE DYES

Condensation products of quinaldines with phthalic anhydrides (quinophthalones) are known in large number. They are yellow dyes which find utility for dyeing textile material and as insoluble dyes for coloring thermoplastics. Condensation products of iminoisoindolinone with monoaminobenzene and diaminobenzene derivatives are also known in large number. The condensation products of a molecule of a phenylenediamine with two molecules of a tetrachloroiminoisoindolinone are of particular economic importance.

Asymmetrical condensation products of diiminoisoindoline with one molecule of a C,H-acidic compound and one molecule of an aromatic primary amine are similarly known in large number. Such compounds are used, for example, for mass-coloring polyester fibers in the melt (German Laid-Open Application No. DOS 2,615,394).

It is an object of the present invention to provide further dyes which, in plastics, produce pure and bright colors of high thermostability.

According to the invention there are provided quinophthalone dyes (I) which formally combine in one molecule not only the methine chromophore of quinophthalone dyes but also the azomethine chromophore and to some extent also the methine chromophore of isoindoline dyes. The quinophthalone dye of the invention have the formula (I)

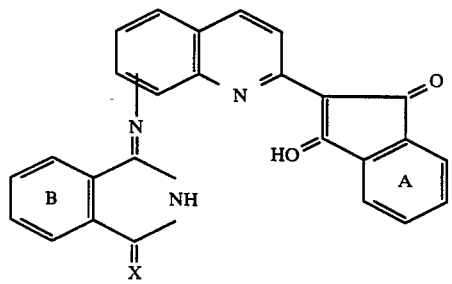

(I)

where X is O or

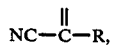

R being cyano, carbamyl, N—$C_1$–$C_4$— alkylcarbamyl, N-phenylcarbamyl, methoxycarbonyl, ethoxycarbonyl, 2-quinazolonyl, 2-quinoxalinonyl, 2-benzimidazolyl or 2-benzothiazolyl, and the rings A and B, the quinoline ring system, the phenyl radical in the phenylcarbamoyl substituent R and the benzo rings fused to the heterocyclic rings in the substituent R may be substituted by one or more insolubilizing substituents.

The dyes (I) are useful dyes which are distinguished by bright hues and good fastness properties, of which a high thermostability in thermoplastics is particularly noteworthy.

Suitable insolubilizing substituents on rings A and B, on the quinoline system, on the phenyl radical in the N-phenylcarbamoyl substituent R and/or on the benzene rings fused to the heterocyclic rings in the substituent R are for example $C_1$–$C_4$-alkyl, $C_1$–$C_4$-alkoxy, halogen such as fluorine, chlorine or bromine, $C_1$–$C_4$-alkoxycarbonyl, nitro, hydroxyl and/or trifluoromethyl. The number of these substituents depends not only on the substituents themselves but also on the ring systems which carry the substituents. For instance, rings A and B can each carry up to 4 halogens or 1 or 2 of the other substituents. The quinoline system can be substituted by up to 2 substituents.

Of the compounds of the formula (I), preference is given to those in which the quinoline ring system is either unsubstituted or substituted in the 3-position by hydroxyl or in the 4-position by methyl.

Preference is given to dyes of the formula (Ia)

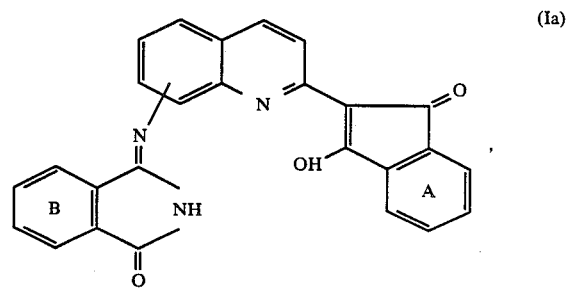

(Ia)

where the rings A and B are each substituted by 4 halogens, in particular by 4 chlorines.

Of these, the dye of the formula (IIa)

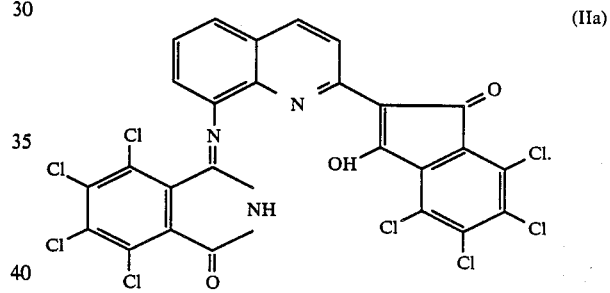

(IIa)

is particularly preferred.

Preference is further given to dyes of the formula (Ib)

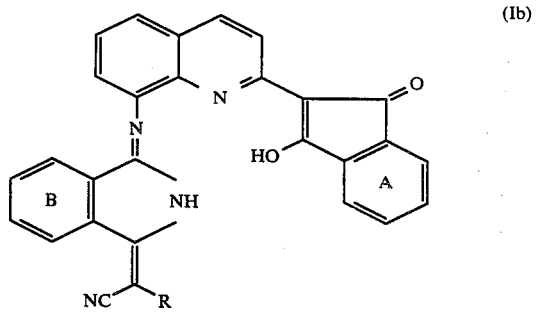

(Ib)

where R is cyano, carbamoyl, N-$C_1$-$C_4$-alkylcarbamyl, N-phenylcarbamyl, methoxycarbonyl, ethoxycarbonyl, 2-quinazolonyl, 2-quinoxalinonyl, 2-benzimidazolyl or 2-benzothiazolyl and the quinoline ring is unsubstituted or substituted in the 3-position by hydroxyl or in the 4-position by methyl, the ring B is unsubstituted and the ring A is substituted by four halogen atoms. Suitable halogens are here fluorine, chlorine and bromine.

Of the lastmentioned dyes (Ib), particular preference is given to those in which R is carbamyl, N-$C_1$-$C_4$- alkylcarbamyl, unsubstituted or chlorine-, fluorine-, methyl-, methoxy-, methoxycarbonyl-, trifluoromethyl- and/or nitro-substituted N-phenylcarbamoyl, 2-quinazolonyl, 2-benzimidazolyl or 2-benzothiazolyl.

Of the dyes (Ib), very particular preference is given to dyes of the formula (IIb)

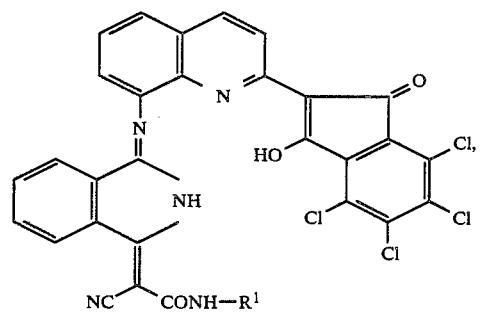

(IIb)

where $R^1$ is hydrogen, $C_1$–$C_4$-alkyl or unsubstituted or chlorine-, fluorine-, methyl-, methoxy-, methoxycarbonyl-, or trifluoromethyl-substituted phenyl.

The dyes (I) where X is 0 can be prepared by condensing in a first stage a 3-iminoisoindolin-1-one of the formula (IIIa)

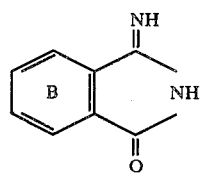

(IIIa)

with an aminoquinaldine of the formula (IV)

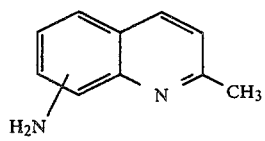

(IV)

in a molar ratio of 1:1 with elimination of ammonia to give the N-quinaldinyliminoisoindolinone of the formula (Va)

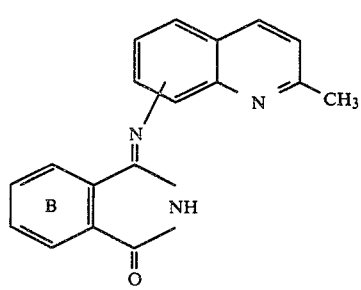

(Va)

(Va) is then condensed in a second stage with a molecule of a phthalic anhydride of the formula (VI)

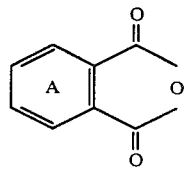

(VI)

with the elimination of water to give the dye of the formula (I).

The rings A and B and the quinoline system may be substituted in the abovementioned manner.

The novel dyes (I) where X is N—C—R can be prepared by condensing in a first stage the 1-[cyanomethylene]-3-iminoisoindoline compound (IIIb)

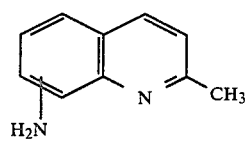

(IIIb)

with a molecule of an aminoquinaldine (IV)

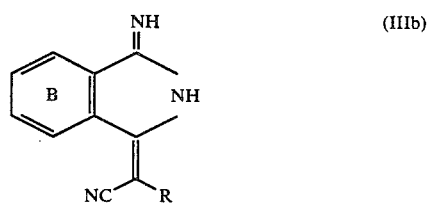

(IV)

with elimination of ammonia to give the isoindoline dye (Vb)

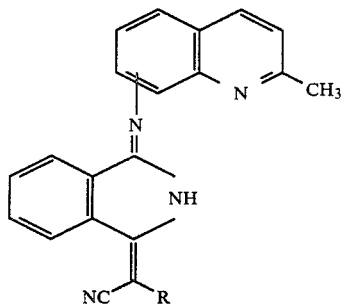

(Vb) is then condensed in a second stage with a molecule of a phthalic anhydride of the formula (VI)

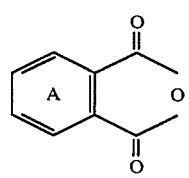

(VI)

with elimination of water to give the dye of the formula (I).

In the formulae (IIb) and (Vb), R has the above-mentioned meanings. The rings A and B, the quinaldine system, the phenyl radical in R and/or the benzo rings in R may be substituted as specified above.

The iminoisoindolinones (IIIa) and the 1-[cyanomethylene]-3-iminoisoindoline compounds (IIIb) are each reacted with the aminoquinaldines (IV) in a conventional manner in an anhydrous solvent at elevated temperature. In general, temperatures of from 50° C. to 130° C. are sufficient. The solvent can be for example a lower aliphatic carboxylic acid such as acetic acid.

The isoindoline dyes (Va) and (Vb) are advantageously isolated, for example by filtration, before condensation in the second stage with the phthalic anhydride in a conventional manner in a high-boiling solvent at 130° C.–220° C. The solvent for this stage can be for example a chlorobenzene or nitrobenzene.

The amount of solvent is not critical with either reaction step, as long as the reaction mixture remains stirrable. The dyes of the formula (I) are obtained in a form in which they can be used directly for coloring surface finishes, printing inks and plastics. However, the dyes obtained in the synthesis are advantageously converted by conventional finishing into pigmentary forms optimized for application.

The Examples below serve to illustrate the invention in more detail. The parts and percentages are by weight.

EXAMPLE 1

(a) 16 parts of 8-aminoquinaldine and 33 parts of 1-[cyano-N-4-chlorophenylcarbamylmethylene]-3-iminoisoindoline are stirred for five hours at the boil in 500 parts of glacial acetic acid. Cooling down is followed by filtration, washing with glacial acetic acid and methanol and drying. Yield: 40 parts of the isoindoline dye of the formula (VII)

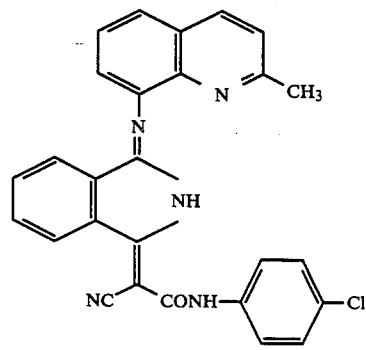

(VII)

in the form of a reddish yellow powder which melts at 280°–285° C.

(b) 47 parts of the isoindoline dye of the formula (VII) from 1(a) are heated together with 30 parts of tetrachlorophthalic anhydride at 200° C. in 400 parts of nitrobenzene for 7 hours. Cooling down to 70° C. is followed by dilution with 50 parts of methanol and filtration. Washing with methanol is followed by drying. This gives 30 parts of the dye of the formula (VIII)

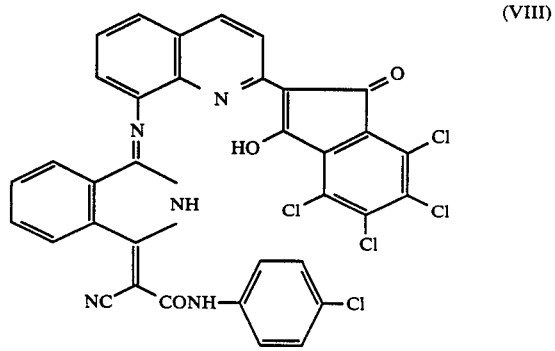

(VIII)

which, incorporated into surface finishes, produces pure orange colors of high light and migration fastness.

(c) 10 parts of dye VIII from 1(b) are stirred at 120° C. in 100 parts of dimethylformamide for 3 hours. This is followed by hot filtration at 90° C., washing with dimethylformamide and methanol and drying, giving 8 parts of dye VIII of improved migration fastness compared with the crude pigment from 1(b).

EXAMPLES 2 TO 20

Example 1(a)–(c) is repeated, except that the 1-[cyanocarbamylmethylene]-3-iminoisoindoline (IIIb), quinaldine (IV) and phthalic anhydride (VI) are replaced by those mentioned in the table below, affording dyes of the formula (Ib) having the indicated hues and similar properties.

| Ex. | IIIb | IV | VI | hue |
|---|---|---|---|---|
| 2 | (structure) | (structure) | (structure) | orange |

-continued

| Ex. | IIIb | IV | VI | hue |
|---|---|---|---|---|
| 3 | (2-(C(=NH)CH₃)phenyl)-C(CH₃)=C(CN)-CONH-C₆H₄-Cl(4) | 6-amino-2-methylquinoline | tetrachlorophthalic anhydride | red |
| 4 | (2-(C(=NH)CH₃)phenyl)-C(CH₃)=C(CN)-CONH-C₆H₄-Cl(4) | 5-chloro-8-amino-2-methylquinoline | tetrachlorophthalic anhydride | orange |
| 5 | (2-(C(=NH)CH₃)phenyl)-C(CH₃)=C(CN)-CONH-C₆H₄-Cl(4) | 6-amino-3-hydroxy-2-methylquinoline | tetrachlorophthalic anhydride | red |
| 6 | (2-(C(=NH)CH₃)phenyl)-C(CH₃)=C(CN)-CONH-C₆H₅ | 8-amino-2-methylquinoline | tetrachlorophthalic anhydride | orange |
| 7 | (2-(C(=NH)CH₃)phenyl)-C(CH₃)=C(CN)-CONH-C₆H₄-CH₃(4) | 8-amino-2-methylquinoline | tetrachlorophthalic anhydride | yellowish red |
| 8 | (2-(C(=NH)CH₃)phenyl)-C(CH₃)=C(CN)-CONH₂ | 8-amino-2-methylquinoline | tetrachlorophthalic anhydride | orange |

-continued

| Ex. | IIIb | IV | VI | hue |
|---|---|---|---|---|
| 9 | 2-(C(=NH)CH₃)-phenyl-C(CH₃)=C(CN)-CONHCH₃ (enamine with NH) | 8-amino-2-methylquinoline | tetrachlorophthalic anhydride | orange |
| 10 | 2-(C(=NH)CH₃)-phenyl-C(CH₃)=C(CN)-CONH-C(=N-)-NH-(2-aminophenyl) benzimidazole derivative | 8-amino-2-methylquinoline | tetrachlorophthalic anhydride | yellowish red |
| 11 | 2-(C(=NH)CH₃)-phenyl-C(CH₃)=C(CN)-CONH-(3,4-dichlorophenyl) | 8-amino-2-methylquinoline | tetrachlorophthalic anhydride | yellowish red |
| 12 | 2-(C(=NH)CH₃)-phenyl-C(CH₃)=C(CN)-CONH-(2,5-dimethoxy-4-chlorophenyl) | 8-amino-2-methylquinoline | tetrachlorophthalic anhydride | brown |
| 13 | 2-(C(=NH)CH₃)-phenyl-C(CH₃)=C(CN)-CONH-(4-chlorophenyl) | 8-amino-2-methylquinoline | tetrabromophthalic anhydride | yellowish red |

-continued

| Ex. | IIIb | IV | VI | hue |
|---|---|---|---|---|
| 14 | 2-(1-iminoethyl)phenyl group with C(CH₃)=C(CN)CONH-(4-chlorophenyl) | 8-amino-2-methylquinoline | 3-chlorophthalic anhydride | orange |
| 15 | 2-(1-iminoethyl)phenyl group with C(CH₃)=C(CN)CONH-(4-chlorophenyl) | 8-amino-2-methylquinoline | 4,5-dichlorophthalic anhydride | orange |
| 16 | 2-(1-iminoethyl)phenyl group with C(CH₃)=C(CN)CONH-(4-chlorophenyl) | 8-amino-2-methylquinoline | 4-nitrophthalic anhydride | orange |
| 17 | 2-(1-iminoethyl)phenyl group with C(CH₃)=C(CN)CONH-(4-chlorophenyl) | 8-amino-2-methylquinoline | 3-nitrophthalic anhydride | orange |
| 18 | 2-(1-iminoethyl)phenyl group with C(CH₃)=C(CN)CONH-(4-chlorophenyl) | 8-amino-2-methylquinoline | phthalic anhydride | orange |

-continued

| Ex. | IIIb | IV | VI | hue |
|---|---|---|---|---|
| 19 | (structure) | 8-aminoquinaldine | 4-chlorophthalic anhydride | orange |
| 20 | (structure) | 8-aminoquinaldine | tetrafluorophthalic anhydride | orange |

EXAMPLE 21

(a) 16 parts of 8-aminoquinaldine and 28 parts of tetrachloroiminoisoindolinone are stirred at the boil in 400 parts of glacial acetic acid for 5 hours. Cooling down is followed by filtration, washing with glacial acetic acid and methanol and drying. Yield: 33 parts of quinaldyliminoisoindolinone of the formula (IX)

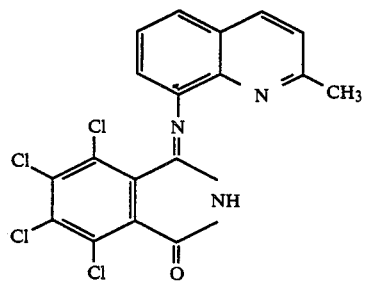

(IX)

in the form of a greenish yellow powder which melts at 316°–18° C.

(b) 43 parts of the monocondensate (IX) are heated together with 43 parts of tetrachlorophthalic anhydride at 200° C. in 450 parts of nitrobenzene in the presence of 2 parts of anhydrous zinc chloride for 7 hours. Cooling down to 70° C. is followed by dilution with 100 parts of methanol and filtration. Washing with methanol is followed by drying. Yield: 60 parts of the dye of the formula (IIa) which, incorporated in surface finishes, gives pure orange colors of high light and migration fastness.

(c) 50 parts of the dye (IIa) from 21(b) are stirred at 120° C. in 300 parts of dimethylformamide for 3 hours. This is followed by hot filtration at 80° C., washing with dimethylformamide and methanol and drying. Yield: 37 parts of a pigmentary form of the dye (IIb), which has improved migration fastness properties compared with the dye from 1(b).

EXAMPLES 22 TO 41

Example 21(a)–(c) is repeated using the iminoisoindolinones (IIIa), quinaldine compounds (IV) and phthalic anhydrides (VI) indicated in the table below. The corresponding dyes of the formula (Ia) which, on incorporation into the surface finish, produce colors in the hues indicated in column 5 are obtained. The surface finish colors are of high light fastness and migration fastness.

| Ex. | IIIa | IV | VI | hue |
|---|---|---|---|---|
| 22 | tetrachloro iminoisoindolinone | 4-methyl-8-aminoquinaldine | tetrachlorophthalic anhydride | orange |
| 23 | tetrachloro iminoisoindolinone | 6-amino quinaldine | tetrachlorophthalic anhydride | yellowish red |

-continued

| Ex. | IIIa | IV | VI | hue |
|---|---|---|---|---|
| 24 | 2,3,4,5-tetrachloro-benzene with C(=NH)CH₃ and C(=O)CH₃ substituents | 6-chloro-8-amino-2-methylquinoline | tetrachlorophthalic anhydride | orange |
| 25 | 2,3,4,5-tetrachloro-benzene with C(=NH)CH₃ and C(=O)CH₃ substituents | 6-amino-3-hydroxy-2-methylquinoline | tetrachlorophthalic anhydride | yellowish red |
| 26 | benzene with C(=NH)CH₃ and C(=O)CH₃ substituents | 8-amino-2-methylquinoline | tetrachlorophthalic anhydride | orange |
| 27 | 4,5-dichloro-benzene with C(=NH)CH₃ and C(=O)CH₃ substituents | 8-amino-2-methylquinoline | tetrachlorophthalic anhydride | orange |
| 28 | 4,5-dichloro-benzene with C(=NH)CH₃ and C(=O)CH₃ substituents | 8-amino-2-methylquinoline | tetrabromophthalic anhydride | orange |
| 29 | chloro-benzene with C(=NH)CH₃ and C(=O)CH₃ substituents | 8-amino-2-methylquinoline | tetrachlorophthalic anhydride | orange |
| 30 | nitro-benzene with C(=NH)CH₃ and C(=O)CH₃ substituents | 8-amino-2-methylquinoline | tetrachlorophthalic anhydride | orange |
| 31 | 2,3,4,5-tetrachloro-benzene with C(=NH)CH₃ and C(=O)CH₃ substituents | 8-amino-2-methylquinoline | phthalic anhydride | orange |
| 32 | 2,3,4,5-tetrachloro-benzene with C(=NH)CH₃ and C(=O)CH₃ substituents | 8-amino-2-methylquinoline | 4-chlorophthalic anhydride | orange |

-continued

| Ex. | IIIa | IV | VI | hue |
|---|---|---|---|---|
| 33 | 2,3,4-trichloro-6-(1-iminoethyl)acetophenone | 8-amino-2-methylquinoline | 4,5-dichlorophthalic anhydride | orange |
| 34 | 2,3,4-trichloro-6-(1-iminoethyl)acetophenone | 8-amino-2-methylquinoline | 4-methoxycarbonylphthalic anhydride | orange |
| 35 | 2,3,4-trichloro-6-(1-iminoethyl)acetophenone | 8-amino-2-methylquinoline | 3-nitrophthalic anhydride | yellowish red |
| 36 | 2,3,4-trichloro-6-(1-iminoethyl)acetophenone | 8-amino-2-methylquinoline | 4-nitrophthalic anhydride | yellowish red |
| 37 | 2,3,4-trichloro-6-(1-iminoethyl)acetophenone | 8-amino-2-methylquinoline | tetrabromophthalic anhydride | red |
| 38 | 2,3,4-trichloro-6-(1-iminoethyl)acetophenone | 8-amino-2-methylquinoline | tetrafluorophthalic anhydride | orange |
| 39 | 2,3,4-trichloro-6-(1-iminoethyl)acetophenone | 8-amino-2,4-dimethylquinoline | 4,5-dichlorophthalic anhydride | orange |
| 40 | 4,5-dichloro-2-(1-iminoethyl)acetophenone | 8-amino-2,4-dimethylquinoline | 4,5-dichlorophthalic anhydride | orange |

| Ex. | IIIa | IV | VI | hue |
|---|---|---|---|---|
| 41 | 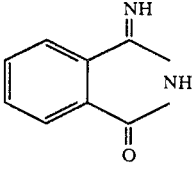 | 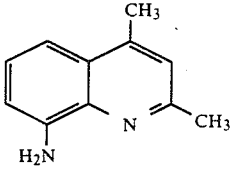 | 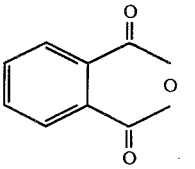 | yellowish red |
We claim:
1. A quinophthalone dye of the formula
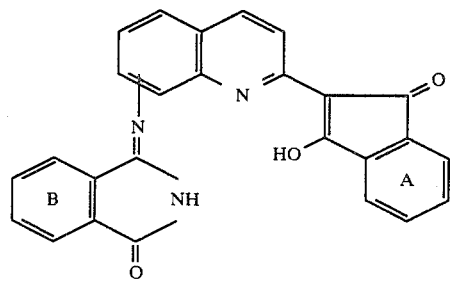
where the rings A and B are each substituted by 4 halogens selected from the group consisting of fluorine, chlorine and bromine.
2. A quinophthalone dye as claimed in claim 1, wherein the rings A and B are each substituted by 4 chlorine atoms.
3. A dye as claimed in claim 1, of the formula
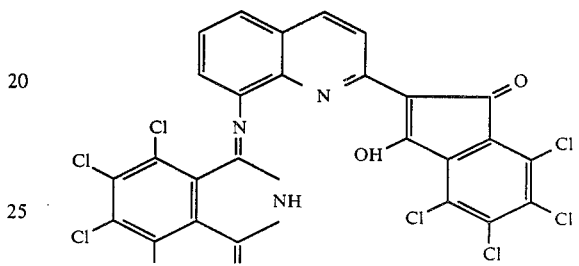
* * * * *